(12) United States Patent
Nagao et al.

(10) Patent No.: US 7,440,207 B2
(45) Date of Patent: Oct. 21, 2008

(54) MAGNETIC-TRANSFER METHOD, MAGNETIC RECORDING MEDIUM, AND MAGNETIC RECORDING DEVICE

(75) Inventors: Makoto Nagao, Odawara (JP); Satoshi Wakamatsu, Odawara (JP); Minoru Araki, Odawara (JP); Kazunori Komatsu, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 11/248,292

(22) Filed: Oct. 13, 2005

(65) Prior Publication Data

US 2006/0077582 A1 Apr. 13, 2006

(30) Foreign Application Priority Data

Oct. 13, 2004 (JP) ............................. 2004-299161
Oct. 22, 2004 (JP) ............................. 2004-308480

(51) Int. Cl.
*G11B 5/86* (2006.01)
(52) U.S. Cl. ............................. 360/17; 360/15; 360/16
(58) Field of Classification Search ............... None
See application file for complete search history.

(56) References Cited

U.S. PATENT DOCUMENTS

| | | | |
|---|---|---|---|
| 6,338,899 B1 * | 1/2002 | Fukuzawa et al. ...... 360/324.12 |
| 6,347,016 B1 * | 2/2002 | Ishida et al. .................. 360/17 |
| 6,433,944 B1 * | 8/2002 | Nagao et al. .................. 360/16 |
| 6,636,371 B1 * | 10/2003 | Komatsu et al. .............. 360/16 |
| 6,790,534 B2 * | 9/2004 | Nishikawa et al. ....... 428/848.5 |
| 6,816,327 B2 * | 11/2004 | Nishikawa et al. ............ 360/17 |
| 6,865,039 B2 * | 3/2005 | Hamaguchi et al. ........... 360/17 |
| 6,914,735 B2 * | 7/2005 | Hamada et al. ............... 360/17 |
| 2002/0163747 A1 | 11/2002 | Komatsu et al. |
| 2003/0072095 A1 * | 4/2003 | Saito .......................... 360/17 |

\* cited by examiner

*Primary Examiner*—Hoa T. Nguyen
*Assistant Examiner*—Dismery E Mercedes
(74) *Attorney, Agent, or Firm*—Sughrue Mion, PLLC

(57) ABSTRACT

Provided is a method of magnetic transfer. The method includes initially DC-magnetizing a transfer-recipient disc in a circumferential direction, by applying a magnetic field to the transfer-recipient disc in the circumferential direction thereof bringing initially DC-magnetized transfer-recipient disc and a master disc into close contact with each other, on the top side of the master disc a magnetic layer including a great number of protrusions that configure a magnetic pattern being formed; and executing magnetic transfer in such a way that a magnetic-field generation device is provided, and that, when a magnetic field is applied in a circumferential direction to the transfer-recipient disc and the master disc, transfer of the magnetic pattern of the master disc onto the transfer-recipient disc occurs.

3 Claims, 13 Drawing Sheets

FIG.9

| RATIO OF DIMENSION THICKNESS/BIT LENGTH | RATIO OF MAGNETIC FIELD Hdv/Hdh | RATIO OF MAGNETIC FIELD C/N(dB) |
|---|---|---|
| 0.3 | 0.5 | -1.0 |
| 0.5 | 0.5 | 0.0 |
| 0.5 | 0.2 | 0.5 |
| 0.5 | 0.8 | -1.5 |
| 2 | 0.1 | 1.2 |
| 2 | 0.5 | 1.0 |
| 2 | 0.7 | -1.1 |
| 4 | 0.4 | 0.5 |
| 4 | 0.9 | -2.0 |
| 5 | 0.5 | -1.1 |

# MAGNETIC-TRANSFER METHOD, MAGNETIC RECORDING MEDIUM, AND MAGNETIC RECORDING DEVICE

BACKGROUND OF THE INVENTION

1. Field of the Invention

The present invention relates to magnetic-transfer methods, magnetic recording media, and magnetic recording devices, and particularly to a magnetic-transfer method suitable for transferring a magnetic information pattern, such as format information, from a master disc to a magnetic disc to be utilized in a hard disc device, or the like, a magnetic recording medium manufactured through the method, and a magnetic recording device including the magnetic recording medium.

2. Description of the Related Art

In general, magnetic discs (hard discs) to be utilized in hard disc drives, which have rapidly spread in recent years, are delivered from a magnetic disc manufacturer to a drive manufacturer, and then format and address information items are written onto the magnetic discs before they are integrated in drives. The writing can be executed through a magnetic head; however, it is efficient and preferable to collectively transfer the format and address information items from a master disc onto which the information items have been written to a magnet disc.

In the magnetic-transfer technology, with a master disc and a transfer-recipient disc (slave disc) being closely contacted to each other, by providing magnetic-field generation devices, such as an electromagnet device or a permanent magnet device, at one side, or at both side, of the combined discs to apply a transfer magnet field, a magnetization pattern corresponding to information (e.g., a servo signal) that the master disc has is transferred.

To date, various proposals have been implemented for a magnetic-transfer technology as such (e.g., Japanese Patent Application Laid-Open No. 2002-251723). Japanese Patent Application Laid-Open No. 2002-251723 proposes that, in implementing magnetic transfer, the application angle of a transfer magnet field be within ±30° from the direction vertical to the surface of a slave disc. Accordingly, an effect is allegedly demonstrated in which the transfer magnet field can accurately be applied along the track.

SUMMARY OF THE INVENTION

Meanwhile, in the foregoing magnetic-transfer method, in order to enhance the accuracy of transferring to the recording side of a transfer-recipient disc (slave disc) a magnetization pattern formed on the magnetic layer of a master disc, the transfer magnet field is required to be applied accurately along the track, with the close contact between the information-carrying side of the master disc and the surface of the transfer-recipient disc being secured.

However, in a conventional technology as such, because the ratio of a transfer magnetic field vertical to the surface of the disc to a transfer magnetic field in parallel with the surface of the disc spatially varies, the intensity sequentially varies with the relative movement between the magnetic-field generation device and the disc. As a result, there is a problem in that the C/N ratio of a reproduced signal from the transfer-recipient disc is deteriorated.

The present invention has been executed in consideration of the foregoing situations; it is an object to provide a magnetic-transfer method, a magnetic recording medium manufactured through the method, and a magnetic recording device including the magnetic recording medium that enable accurate transfer of a magnetization pattern to be executed, by, in executing magnetic transfer, specifying a tolerance range for the application direction of a transfer magnet field.

In order to achieve the foregoing object, the present invention provides a magnetic-transfer method comprising the steps of:

initially DC-magnetizing a transfer-recipient disc in a circumferential direction, by applying a magnetic field to the transfer-recipient disc in the circumferential direction thereof;

bringing initially DC-magnetized transfer-recipient disc and a master disc into close contact with each other, on the top side of the master disc a magnetic layer including a great number of protrusions that configure a magnetic pattern being formed, ratio t/b of thickness t of the magnetic layer to circumferential length b of the protrusion being from 0.5 to 4.0; and executing magnetic transfer in such a way that a magnetic-field generation device is provided, and that, when a magnetic field is applied in a circumferential direction to the transfer-recipient disc and the master disc so as to transfer the magnetic pattern of the master disc onto the transfer-recipient disc, ratio Hv/Hh of the strength Hv of a magnetic field, of the circumferential magnetic field, that is vertical to the top side of the transfer-recipient disc, to the strength Hh of a magnetic field, of the circumferential magnetic field, that is in parallel with the top side of the transfer-recipient disc, is made equal to or smaller than $0.629 - 0.0571 \times t/b$.

The present inventors found that, by executing magnetic transfer in such a way that, the ratio Hv/Hh of the strength Hv of a magnetic field, of a circumferential magnetic field, that is vertical to the disc plane, to the strength Hh of a magnetic field, of the circumferential magnetic field, that is in parallel with the disc plane, is the same or smaller than $0.629 - 0.0571 \times t/b$, the C/N ratio of a signal reproduced from a transfer-recipient disc is enhanced, and a reproduced signal having a good waveform is obtained.

Therefore, according to the present invention, the C/N ratio of a transferred signal is enhanced, and the transferred signal has a good waveform, whereby good tracking properties are obtained.

In a magnetic-recording method according to the present invention, it is preferable that magnetic transfer is executed while the transfer-recipient disc and the master disc that are into close contact with each other are moved relatively to the magnetic-field generation device. As described above, by moving the magnetic-field generation device and the magnetic medium relatively to each other, the efficiency of magnetic transfer is raised.

Moreover, in a magnetic-recording method according to the present invention, it is preferable that, after the circumferential magnetic field is applied, once or more times in the circumferential direction, to the transfer-recipient disc and the master disc that into close contact with each other, the strength of circumferential magnetic field is decreased down to a predetermined value, and then relative movement, to the magnetic-field generation device, of the transfer-recipient disc and the master disc that are into close contact with each other is halted.

As discussed above, if, after the circumferential-direction transfer during one-turn of rotation, the strength of the magnetic filed is gradually decreased down to a predetermined value and then the relative movement is halted, the transfer accuracy is less affected, whereby the C/N ratio of a reproduced signal becomes good.

Still moreover, the present invention provides a magnetic recording medium on which servo information is recorded through the foregoing magnetic-transfer method. According to the magnetic-transfer method, a magnetic recording medium having a good C/N ratio is obtained.

In a magnetic-recording medium according to the present invention, it is preferable that a magnetic layer that creates antiferromagnetic coupling is included. The magnetic recording medium having a magnetic layer that creates antiferromagnetic coupling enables high-density recording to be executed and has a high thermal stability; therefore, an effect of the present invention can further be demonstrated.

Still moreover, the present invention provides a magnetic recording device characterized by including the foregoing magnetic recording medium. By utilizing the magnetic recording medium, a magnetic recording device (such as a hard disc drive) having a good C/N ratio is obtained.

In order to achieve the foregoing object, the present invention provides a magnetic-transfer method comprising the steps of:

initially DC-magnetizing a transfer-recipient disc in a circumferential direction, by applying a magnetic field to the transfer-recipient disc in the circumferential direction thereof;

bringing the initially DC-magnetized transfer-recipient disc and a master disc having a magnetic pattern into close contact with each other; and executing magnetic transfer in such a way that a magnetic-field generation device is provided, and that, when a magnetic field is applied in a circumferential direction to the transfer-recipient disc and the master disc so as to transfer the magnetic pattern of the master disc onto the transfer-recipient disc, while moving relatively to the magnetic-field generation device the transfer-recipient disc and the master disc that are into close contact with each other, the strength of a magnetic field, of the circumferential magnetic field, that is vertical to the top side of the transfer-recipient disc, is made equal to or smaller than 40% of the strength of a magnetic field, of the circumferential magnetic field, that is in parallel with the top side of the transfer-recipient disc.

According to the present invention, the strength of a magnetic field, of the circumferential magnetic field, that is vertical to the disc plane is made the same or smaller than 40% of the strength of a magnetic field that is in parallel with the disc plane; therefore, even though, due to relative movement between the magnetic-field generation device and the disc, the ratio of the vertical magnetic field to the parallel magnetic field sequentially changes, the accuracy of the magnetic transfer is hardly affected. As a result, the C/N ratio of a reproduced signal from a transfer-recipient disc is not deteriorated.

In addition, it is preferable that the ratio of the strength of a magnetic field that is vertical to the disc plane to the strength of a magnetic field that is in parallel with the disc plane is same or smaller than 30%, and it is more preferable that the ratio is same or smaller than 20%.

In a magnetic recording method according to the present invention, it is preferable that, after the circumferential magnetic field is applied, once or more times in the circumferential direction, to the transfer-recipient disc and the master disc that are into close contact with each other, the strength of circumferential magnetic field is decreased down to a predetermined value, and then relative movement, to the magnetic-field generation device, of the transfer-recipient disc and the master disc that are into close contact with each other is halted.

As discussed above, if, after the circumferential-direction transfer during one-turn of rotation, the strength of the magnetic filed is gradually decreased down to a predetermined value and then the relative movement is halted, the transfer accuracy is less affected, whereby the C/N ratio of a reproduced signal becomes good.

Still moreover, the present invention provides a magnetic recording medium on which servo information is recorded through the foregoing magnetic-transfer method. According to the magnetic-transfer method, a magnetic recording medium having a good C/N ratio is obtained.

In a magnetic-recording medium according to the present invention, it is preferable that a magnetic layer that creates antiferromagnetic coupling is included. The magnetic recording medium having a magnetic layer that creates antiferromagnetic coupling enables high-density recording to be executed and has a high thermal stability; therefore, the magnetic recording medium is a suitable medium for transferring through the magnetic-transfer method a microscopic pattern, whereby an effect of the present invention can further be exerted.

Still moreover, the present invention provides a magnetic recording device characterized by including the foregoing magnetic recording medium. By utilizing the magnetic recording medium, a magnetic recording device (such as a hard disc drive) having a good C/N ratio is obtained.

As described above, according to the present invention, the C/N ratio of a transferred signal is enhanced, and the transferred signal has a good waveform, whereby good tracking properties are obtained.

As described above, according to the present invention, the strength of a magnetic field, of the circumferential magnetic field, that is vertical to the disc plane is made the same or smaller than 40% of the strength of a magnetic field that is in parallel with the disc plane; therefore, even though, due to relative movement between the magnetic-field generation device and the disc, the ratio of the vertical magnetic field to the parallel magnetic field sequentially changes, the accuracy of the magnetic transfer is hardly affected. As a result, the C/N ratio of a reproduced signal from a transfer-recipient disc is not deteriorated.

BRIEF DESCRIPTION OF THE DRAWINGS

FIG. 9 is a table representing results of Example 1;

DETAILED DESCRIPTION OF THE PREFERRED EMBODIMENTS

Figure 1:
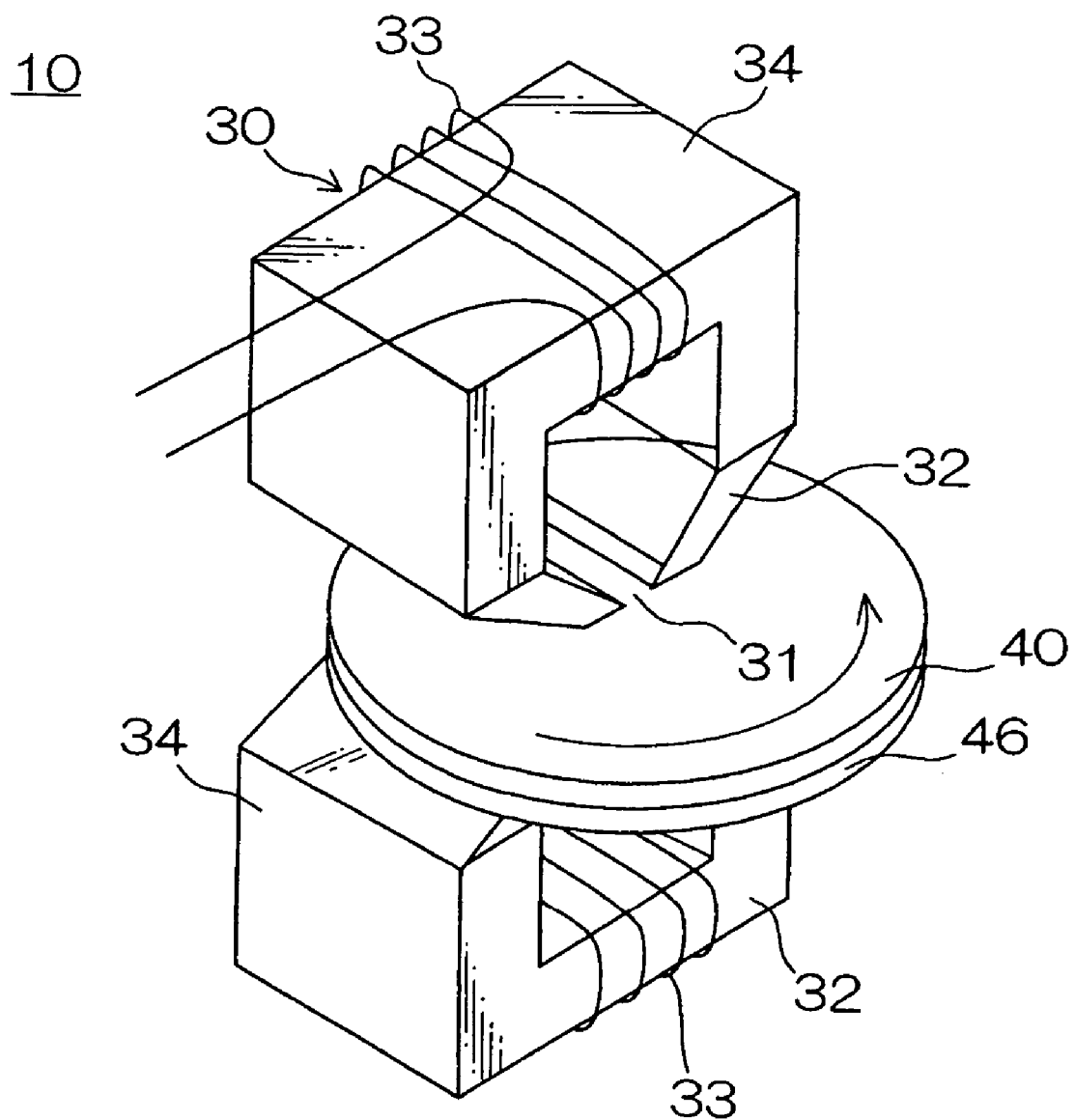
FIG. 1 is a perspective view illustrating principal parts of a magnetic-transfer device for executing a magnetic-transfer method according to the present invention.
Figure 2:
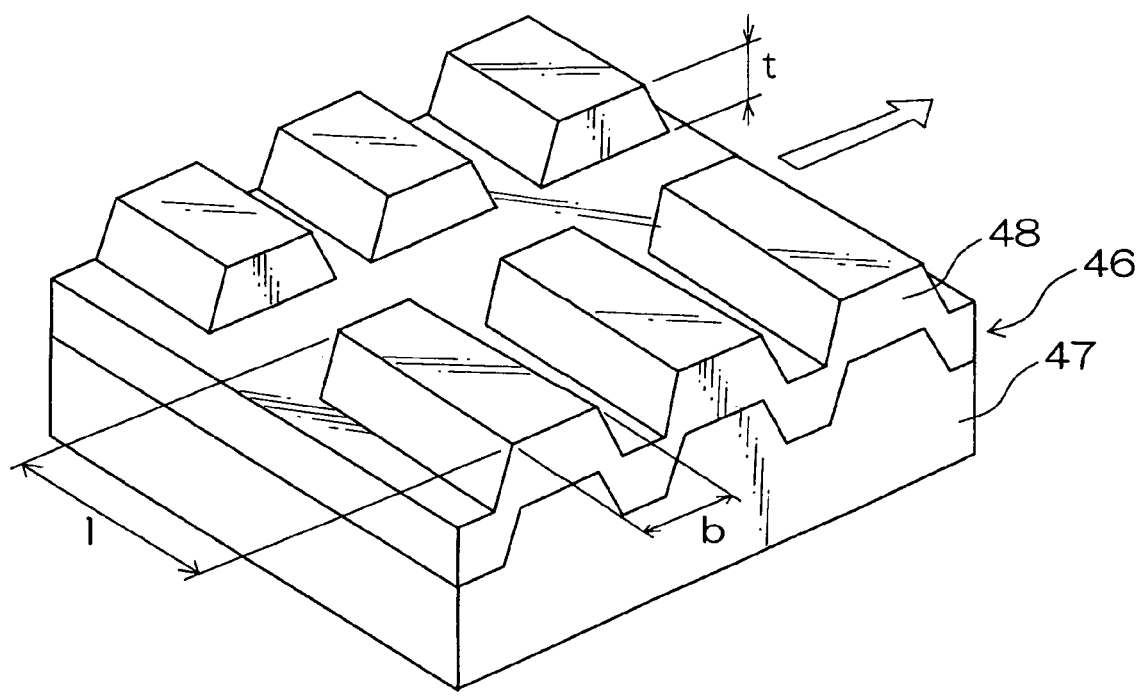
FIG. 2 is an enlarged perspective view illustrating part of a pattern configured of microscopic depressions and protrusions on the top surface of a master disc.

Preferred Embodiment 1 of a magnetic-transfer method, a magnetic recording medium, and a magnetic recording device according to the present invention will be explained in detail below. FIG. 1 is a perspective view illustrating principal parts of a magnetic-transfer device 10 for implementing a magnetic-transfer method according to the present invention. FIG. 2 is an enlarged perspective view illustrating part of a pattern configured of microscopic protrusions on the surface of a master disc 46.

In the magnetic-transfer device 10, when magnetic transfer is implemented, the slave side (magnetic-recording side) of a slave disc (transfer-recipient disc) 40 to which initial DC magnetization illustrated in FIG. 6A, described later, has been applied is made to contact with the information-carrying surface of a master disc 46, thereby being able to be closely contact with the information-carrying side, with predetermined pressing force. With the slave disc 40 and the master disc 46 being contact with each other, by applying a transfer magnet field through a magnetic-field generation device 30, a magnetization pattern such as a servo signal can be transferred and recorded.

The master disc 46 is formed in a disc shape; as illustrated in FIG. 2, a transfer-information carrying side, in which a pattern is configured of a magnetic layer 48 having microscopic protrusions, is formed on the one side of a substrate 47; the other side of the substrate 47 is held by an unillustrated adhesion device. The formation of the pattern configured of microscopic protrusions is implemented through the photofabrication method described later, or the like. The one side (transfer-information carrying side) of the master disc 46 is made to be in contact with the slave disc 40.

The microscopic protrusion configuring a pattern is rectangular when viewed from above; in the case where the magnetic layer 48 having a thickness t is formed, the microscopic protrusion has a length b along the track (indicated by a thick arrow in FIG. 2) and a radial length l. The optimal values of b and l depend on recording density or waveforms of signals to be recorded; for example, the length b may be 80 nm, and the length l may be 200 nm.

In the case of a servo signal, the microscopic protrusions configuring a pattern are formed being radially elongated. In this case, it is preferable, for example, that the radial length l is from 0.05 µm to 20 µm, and the length along the track (in the circumferential direction) is from 0.05 µm to 5 µm. As far as a protrusion configuring a pattern that carries information of the servo signal is concerned, it is preferable to select a protrusion having a radial length, within the foregoing range, longer than that of the length along the track.

It is preferable that the depth (height) of the microscopic protrusion configuring a pattern on the surface of the substrate 47 is 80 nm to 800 nm; it is more preferable that the depth is from 100 nm to 600 nm.

Meanwhile, it is required that the ratio t/b of the thickness t of the magnetic layer 48 to the length b, along the track, of the protrusion is within the range from 0.5 to 4.0. That is because, if the ratio t/b is out of the range, the C/N ratio of a reproduced signal is deteriorated. The detail will be explained in the first example described later.

With regard to the master disc 46, in the case where the substrate 47 is a ferromagnet made mainly of Ni, the magnetic transfer can be implemented through the substrate 47 only, and the magnetic layer 48 is not required to be coated; however, by providing the magnetic layer 48 having a good transfer property, better magnetic transfer can be implemented. In the case where the substrate 47 is a non-magnetic substance, the magnetic layer 48 is required to be provided. It is preferable that the magnetic layer 48 of the master disc 46 is a soft-magnetic layer having a coercivity smaller than 48 kA/m (≦600 Oe).

As the substrate 47 of the master disc 46, glass composed of various substances, such as nickel, silicon, quartz glass and the like, aluminum, an alloy, ceramics composed of various substances, synthetic resin, or the like, can be utilized. The depressions and protrusions on the surface of the substrate 47 can be formed, for example, through the stamper method utilizing a master disc formed through the photofabrication method, or the like.

The formation of a master disc utilized in the stamper method is implemented, for example, as described below. A photoresist layer is formed on a smooth-surface glass plate (or quartz glass plate) through the spin coat method, or the like; after a prebake, with the glass plate being rotated, the approximately entire surface of the photoresist layer is irradiated with a laser beam (or an electron beam) modulated in response to a servo signal, thereby being exposed to a predetermined pattern; for example, circumferential portions corresponding to respective frames are exposed to a pattern, corresponding to a servo signal, that radially and linearly extends from the center of the rotation to each track.

Thereafter, by applying development processing to the photoresist layer, a glass master disc having depressions and protrusions is obtained that is formed of the photoresist layer from which exposed portions have been removed. After that, by plating (electroforming) Ni up to a predetermined thickness on the surface of the glass master disc, along the depressions and protrusions, a Ni substrate is created that has a pattern configured of positive depressions and protrusions. Then, the glass master disc is stripped of the substrate.

The substrate is utilized as a master disc for pressing, as it is, or after being coated with a soft-magnetic layer, a protective layer, and the like, as may be necessary.

In addition, by applying plating to the glass master disc so as to create the second master disc through electroforming, and by further applying plating to the second master disc, a reverse master disc having a pattern configured of negative depressions and protrusions may be created through electroforming. Moreover, by applying plating to the second master disc and implementing electroforming, or by pressing low-viscosity resin to and hardening the second master disc so as to create the third master disc, and by applying plating to the third master disc and implementing electroforming, a substrate having a pattern configured of positive depressions and protrusions may be created.

As a material for the substrate, as far as metal is concerned, Ni or a nickelic alloy can be utilized. As a plating method of creating the substrate, e.g., various types of metal-film formation methods including electroless plating, electroforming, spattering, and ion-plating can be applied.

As the magnetic layer 48 (soft-magnetic layer), a film is formed from a magnetic material, e.g., through a vacuum film-formation method such as the vacuum deposition method, the sputtering method, and the ion-plating method, or the plating method. As a magnetic material for the magnetic layer 48, Co, a cobaltic alloy (e.g., CoNi, CoNiZr, or CoNbTaZr), Fe, a Ferrous alloy (FeCo, FeCoNi, FeNiMo, FeAlSi, FeAl, and FeTaN), Ni, or a nickelic alloy (NiFe) can be utilized. In particular, FeCo or FeCoNi can preferably be utilized. It is preferable that the thickness t of the magnetic layer 48 is within the range from 50 nm to 500 nm; it is more preferable that the thickness t is within the range from 100 nm to 400 nm.

In addition, it is preferable to provide on the magnetic layer 48 a protective film such as a diamond-like carbon; a lubricant layer may further be provided on the protective film. In this case, it is preferable that the protective film is configured of a diamond-like carbon film having a thickness from 5 nm to 30 nm and a lubricant layer. Moreover, an adhesion enhancement layer, e.g., formed of Si, between the magnetic layer 48 and the protective film may be provided. The lubricant has an effect to lessen the deterioration in durability, such as a flaw caused by friction in the case where a positional deviation, which occurs when the magnetic layer 48 and the slave disc 40 contact with each other, is corrected.

The master disc 46 may be formed by utilizing the foregoing master disc for pressing to create a resin substrate, and by providing a magnetic layer on the resin substrate. As a resin material for the resin substrate, an acrylate resin such as a polycarbonate and a polymethylmetacrylate, a vinyl chloride resin such as a polyvinyl chloride and a vinyl chloride copolymer, an epoxy resin, an amorphous polyolefin, or polyester can be utilized.

Among these, a polycarbonate is preferable, from the viewpoint of moisture resistance, size stability, and a price. When a molding has burrs, the burrs are removed through a varnishing or a polishing process. The master disc 46 may be formed by painting a ultraviolet curing resin or an electron beam curing resin through a pin coating or a bar coating method. It is preferable that the height of the protrusions on the resin substrate is within the range from 50 nm to 1000 nm; it is more preferable that the height is within the range from 100 nm to 500 nm.

By coating the microscopic pattern on the resin substrate with the magnetic layer 48, the master disc 46 is obtained. As the magnetic layer 48, a film is formed from a magnetic material, e.g., through a vacuum film-formation method such as the vacuum deposition method, the sputtering method, or the ion-plating method, or through a film-formation method such as the plating method.

Meanwhile, the photo fabrication method, i.e., a kind of methods of forming the master disc 46 is implemented in accordance with the following procedure. In the first place, for example, by painting a photoresist on the smooth surface of a planar substrate, and through exposure and development processing utilizing a photomask corresponding to a servo-signal pattern, a pattern corresponding to information is formed.

In the second place, in an etching process, by etching the substrate in accordance with the pattern, holes having a depth corresponding to the thickness of the magnetic layer 48 are formed. Thereafter, a film having a thickness corresponding to the formed holes is formed from a magnetic material, up to the surface of the substrate, through a vacuum film-formation method such as the vacuum deposition method, the sputtering method, and the ion-plating method, or through the plating method.

Then, the photoresist is removed through the lift-off method, and the surface of the film is polished so as to become smooth, while burrs are removed if there is any.

Next, the slave disc 40 will be explained. The slave disc 40 is a disc-shaped magnetic recording medium, such as a hard disc or a flexible disc, on either one side or both sides of which a magnetic recording layer is formed; prior to the adhesion to the master disc 46, cleaning processing (varnishing or the like) for removing, through a glide head or a polishing agent, microscopic protrusions or attached dust on the surface is applied to the slave disc 40, as may be necessary. In addition, initial magnetization is preliminarily applied to the slave disc 40. The detail for the initial magnetization will be described later.

As the slave disc 40, a disc-shaped magnetic recording medium such as a hard disc or a high-density flexible disc can be utilized. As the magnetic recording layer of the slave disc 40, a film-painting-type magnetic recording layer, a plating-type magnetic recording layer, or a metal-thin film type magnetic recording layer can be utilized.

As a magnetic material for the metal-thin film type magnetic recording layer, Co, a cobaltic alloy (such as CoPtCr, CoCr, CoPtCrTa, CoPtCrNbTa, CoCrB, or CoNi), Fe, or a ferrous alloy (FeCo, FePt, or FeCoNi) can be utilized. These magnetic materials are preferable because they have a large magnetic flux density and magnetic anisotropy having the same direction as that of an applied magnetic field (in-plane direction, in the case of in-plane recording), whereby clear transfer can be implemented.

It is preferable to provide a base layer, in order to create necessary magnetic anisotropy under (at the side of a support) the magnetic material. It is required that the crystal structure and the lattice constant of the base layer coincide with those of the magnetic layer 48. For that purpose, it is preferable to utilize Cr, CrTi, CoCr, CrTa, CrMo, NiAl, Ru, or the like.

The magnetic transfer through master disc 46 includes the cases, as illustrated in FIG. 1, where, with the master disc 46 being in contact with one side of the slave disc 40, transfer is sequentially implemented on the one side and where, with a master disc 46 being in contact with each of both sides of the slave disc 40, transfer is concurrently implemented to the both sides. In addition, prior to the adhesion of the master disc 46 to the slave disc 40, cleaning processing for removing attached dust is applied to the master disc 46, as may be necessary.

Figure 3:
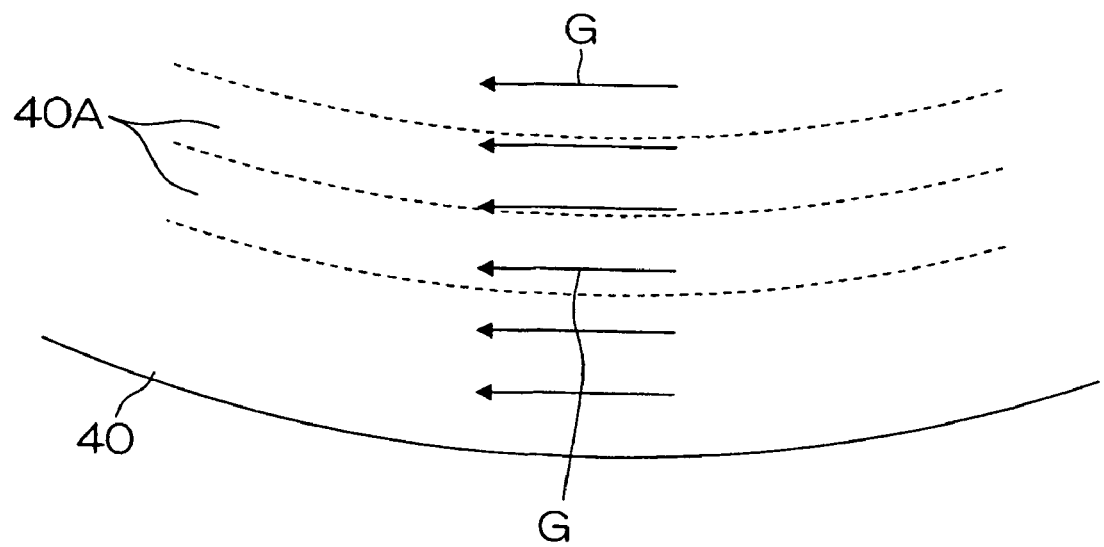
FIG. 3 is a plan view illustrating a way in which a transfer magnetic field is applied.
Figure 4:
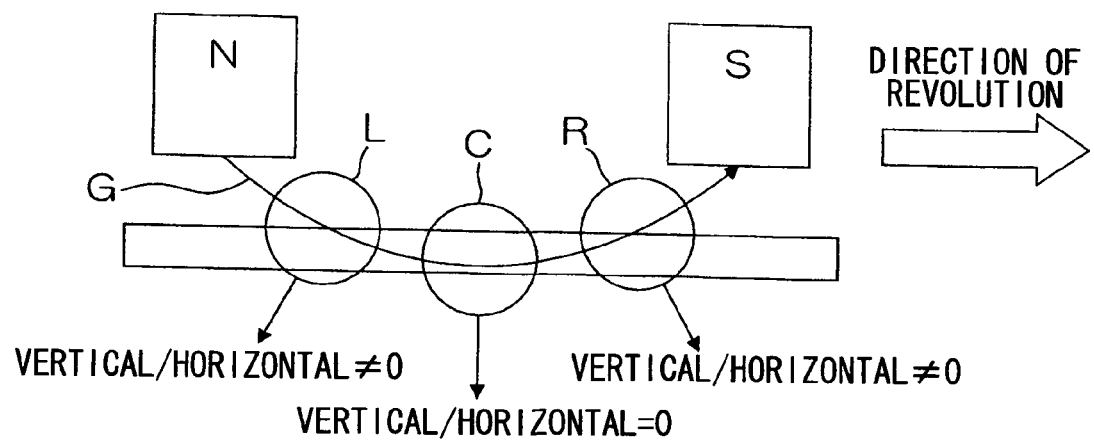
FIG. 4 is a cross-sectional view illustrating a way in which a transfer magnetic field is applied.

A magnetic-field generation device 30 is configured of electromagnet devices 34 and 34 that are provided being put on each side of a combination of the slave disc 40 and the master disc 46 that are held together by an adhesion device; in the electromagnet device 34, a coil 33 is wound onto a core 32 having a gap 31 extending in the radial direction of the slave disc 40 and the master disc 46; the magnetic-field generation device 30 can apply to the slave disc 40 and the master disc 46 transfer magnet fields whose magnetic-field lines G (refer to FIGS. 3 and 4) are in the same direction along the track. FIGS. 3 and 4 are views illustrating the way in which the transfer magnet field is applied; FIG. 3 is a plan view, and FIG. 4 is a cross-sectional view.

A rotation device is provided in such a way that, when the magnetic field is applied, with the slave disc 40 and the master disc 46 being integrally rotated, by applying through the magnetic-field generation device 30 the transfer magnet field, transfer information of the master disc 46 can magnetically be transferred to the slave side of the slave disc 40. In addition to the foregoing configuration, a configuration can be employed in which the magnetic-field generation device 30 is provided so as to revolve.

With regard to a transfer magnet field, a magnetic field having the following distribution of magnetic-field strength is generated at a position along the track: there is no magnetic-field strength, in any direction along the track, that exceeds the maximal value within a range of a optimal transfer magnetic field (0.6 to 1.3 times as large as the coercivity Hc of the slave disc 40); in one direction along the track, at least one portion exists where the magnetic-field strength is within the optimal transfer magnetic field; and in the other direction along the track, the magnetic-field strength is less than the minimal value of the optimal transfer magnetic field, at any position along the track.

Different from the configuration in FIG. 1, the magnetic-field generation device 30 may be provided only at one side of the slave disc 40. In addition, as another embodiment, an electromagnet device, or a permanent magnet device, that creates a transfer magnet field as illustrated in FIGS. 5A to 5C may be provided, as the magnetic-field generation device 30, at either one side or at both sides of the slave disc 40.

Figure 5A:
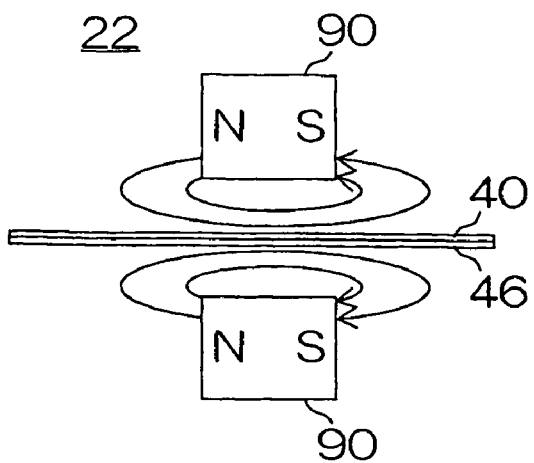
FIGS. 5A to 5C are views illustrating other configurations of a magnetic-field generation device.

The magnetic-field generation device 22 in FIG. 5A is configured in such a way that the both ends, in parallel with the slave side, of a electromagnet 90 (or a permanent magnet) extending along the radius of the slave disc 40, have respective magnetic poles whose polarities are opposite to each other, and creates a magnetic field along the track.

Figure 5B:
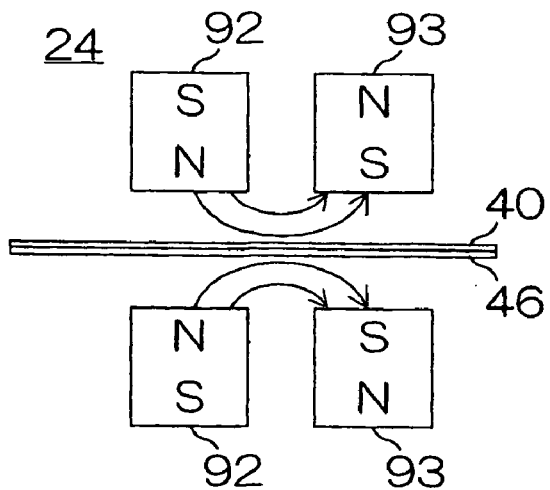

The magnetic-field generation device 24 in FIG. 5B is configured in such a way that the ends, opposing the slave side, of two parallel electromagnets 92 and 93 (or permanent magnets) extending along the radius of the slave disc 40, have respective magnetic poles whose polarities are opposite to each other, and creates a magnetic field along the track.

Figure 5C:
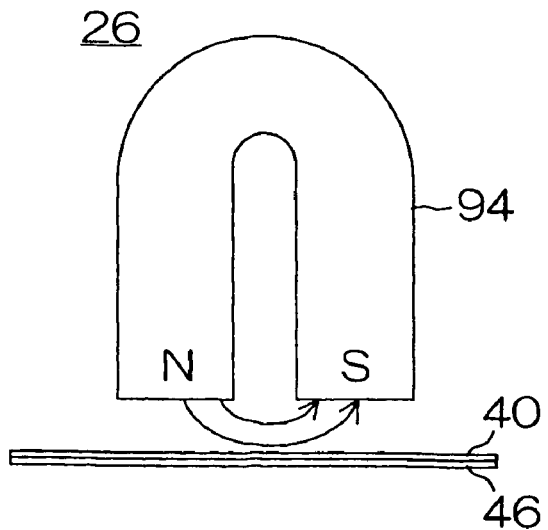

The magnetic-field generation device 26 in FIG. 5C is configured in such a way that two parallel ends, opposing the slave side, of a permanent magnet 94 (or an electromagnets), having a U-shaped cross section, extending along the radius, have respective magnetic poles whose polarities are opposite to each other, and creates a magnetic field along the track.

Next, a method of magnetic transfer through the magnetic-transfer device 10 configured as described above will be described.

Figure 6A:
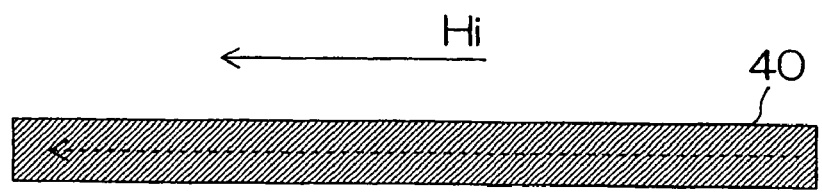
FIGS. 6A to 6C are views illustrating basic steps of a magnetic-transfer method.
Figure 6B:
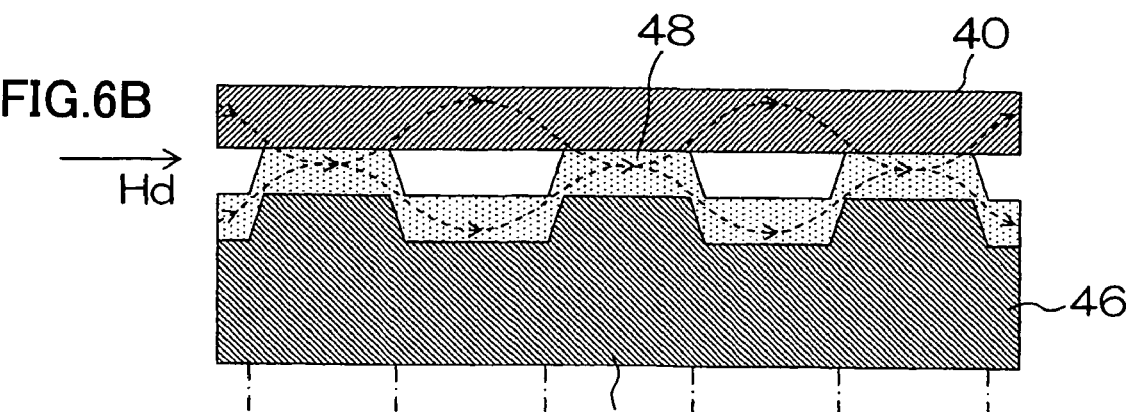
Figure 6C:
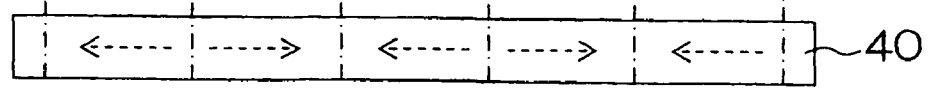

FIG. 6 is a view illustrating a basic process for the magnetic-transfer method. Among FIGS. 6A through 6C, FIG. 6A illustrates a process in which, by applying a magnetic field in one direction, the slave disc 40 is initially DC-magnetized; FIG. 6B, a process in which, with the master disc 46 and the slave disc 40 being in contact with each other, magnetic fields each having opposite polarity to the other are applied; and FIG. 6C, a condition after magnetic transfer.

Figure 7:
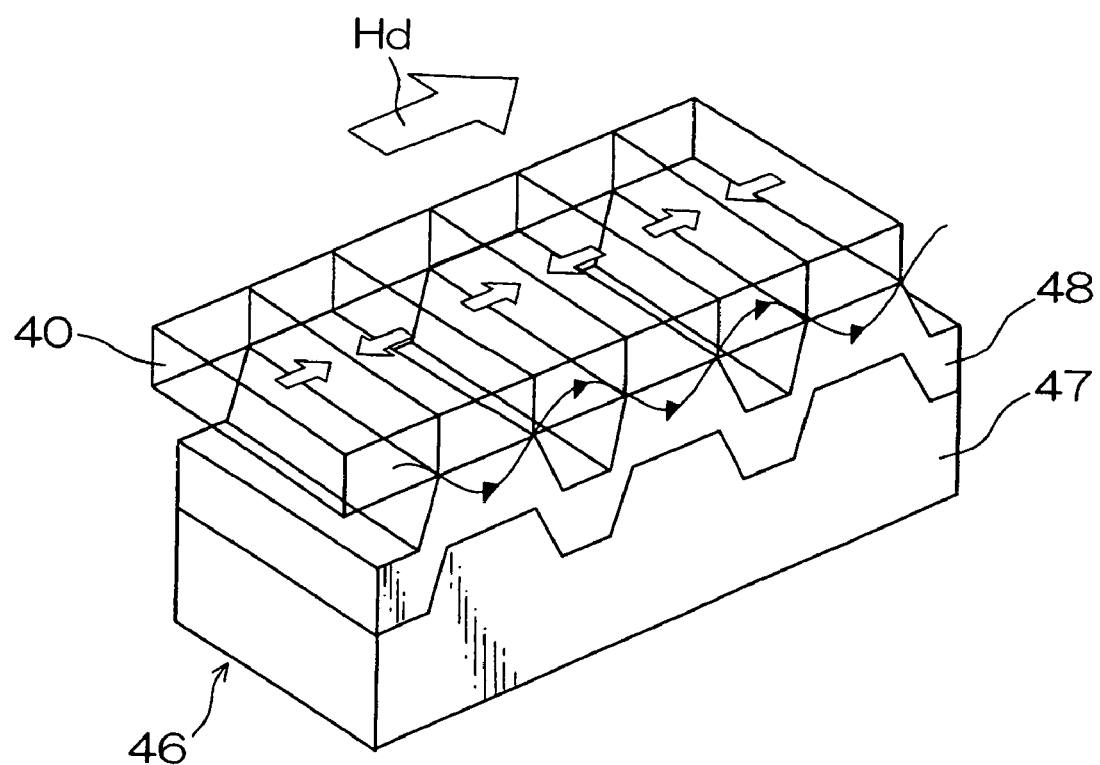
FIG. 7 is a perspective view for explaining a situation of magnetic transfer illustrated in FIG. 6B.

FIG. 7 is a perspective view for explaining a situation of magnetic transfer illustrated in FIG. 6B. In addition, each figure is a schematic view, and the size of each part is illustrated in a ratio different from an actual ratio.

In the first place, as illustrated in FIG. 6A, by applying in one direction along the track (in the circumferential direction) an initial magnetic field Hi to the slave disc 40, initial magnetization (DC degaussing) is preliminarily implemented. In the initial magnetization, a magnetic field is utilized that has at at least one position along the track a portion where the magnetic-field strength is the same or larger than the coercivity Hc of the slave disc 40, or preferably, a magnetic field is utilized that has distribution of magnetic-field strength in which a portion where the magnetic-field strength is the same or larger than the coercivity Hc of the slave disc 40 is included only in one direction along the track, and the magnetic-field strength in the reverse direction is less then the coercivity Hc of the slave disc 40 in either direction along the track. With the magnetic filed being generated at a certain part along the track, by rotating the slave disc 40, or by revolving the magnetic field along the track, the entire tracks are initially magnetized (DC-degaussed).

Thereafter, as illustrated in FIGS. 6B and 7, with the slave side (magnetic recording layer) of the slave disc 40 and the information-carrying side, which is formed by coating the magnetic layer 48 on the microscopic depressions and protrusions in the substrate 47 of the master disc 46, being in contact with each other, by applying a transfer magnetic field, in a direction, along the track of the slave disc 40, opposing the direction of the initial magnetic field, the magnetic transfer is implemented.

As a result, as illustrated in FIG. 6C, onto the slave side (track) of the slave disc 40, a magnetization pattern is transferred and recorded that is in accordance with the pattern configured of contacted protrusions and depressions in the magnetic layer 48, i.e., the information-carrying side of the master disc 46.

In addition, even when the depressions and protrusions on the substrate 47 of the master disc 46 is a negative pattern opposite to the positive pattern illustrated in FIGS. 6A to 6C, by making the directions of the initial magnetic field Hi and the transfer magnetic field Hd reversed to those of the directions of the initial magnetic field Hi and the transfer magnetic field Hd in the case of the positive pattern, a similar magnetization pattern can be transferred and recorded.

In implementing magnetic transfer, it is important to carry out the magnetic transfer in such a way that, the ratio Hdv/Hdh of the strength Hdv of a magnetic field, of the circumferential transfer magnetic field Hd, that is vertical to the disc plane, to the strength Hdh of a magnetic field, of the circumferential transfer magnetic field Hd, that is in parallel with the disc plane, is the same or smaller than $0.629-0.0571 \times t/b$. In addition, as described above, t/b is the ratio of the thickness t of the magnetic layer 48 to the length b, along the track (in the circumferential direction), of the protrusion, and is required to be within the range from 0.5 to 4.0.

Figure 8:
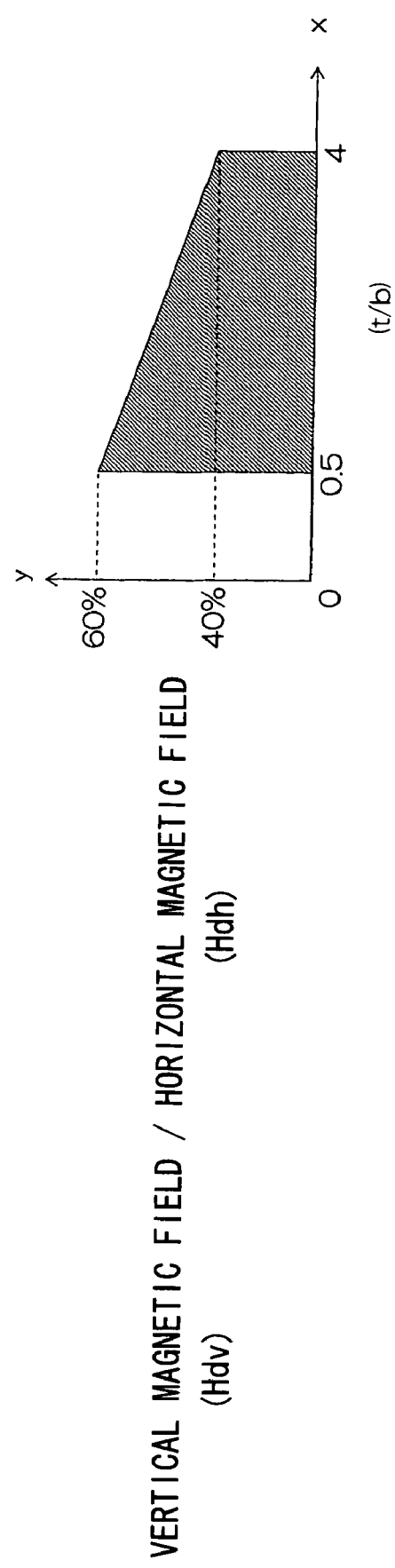
FIG. 8 is a graph for explaining optimal ranges for the ratios Hdv/Hdh and t/b.

The condition described above will be explained with reference to FIG. 8. FIG. 8 is a graph for explaining optimal ranges for the ratios Hdv/Hdh and t/b; the ratio t/b is along the x-axis, and the ratio Hdv/Hdh (in units of %) is along the y-axis. In the graph, the optimal ranges for the ratios Hdv/Hdh and t/b are within the hatched area enclosed by four straight lines, i.e., the line that connects the point where the ratio t/b is 0.5, and the ratio Hdv/Hdh is 60% and the point where the ratio t/b is 4, and the ratio Hdv/Hdh is 40%, that is, the line indicated by $y=0.629-0.0571x$, the line representing that the ratio t/b is 0.5, the line representing that the ratio t/b is 4, and the x-axis (the line representing y=0).

In other words, the strength Hdv of the magnetic field vertical to the disc plane and the strength Hdh of the magnetic in parallel with the disc plane changes in accordance with the positional relation between the disc plane and the gap 31 of the core 32 for the electromagnet device 34. In FIG. 4 described above, at a horizontal position C (within a circle located in the center), Hdv/Hdh is zero, and at horizontal positions R (within a circle located right-hand in FIG. 4) and L (within a circle located left-hand in FIG. 4), Hdv/Hdh is not zero.

As described above, at the middle position between the N pole and the S pole, of the magnet, the strength Hdh of the horizontal magnetic field is maximal, and the strength Hdv of the vertical magnetic field is zero.

In contrast, the farther the position is away from the middle position between the N pole and the S pole, of the magnet, the smaller the strength Hdh of the horizontal magnetic field is, and the larger the strength Hdv of the vertical magnetic field is.

Accordingly, in order to make the ratio Hdv/Hdh with regard to the circumferential-direction magnetic field Hd remain within the hatched area in FIG. 8, it is required to optimally set up, in accordance with the ratio t/b with regard to the master disc 46, each of constituent elements (the electromagnet device 34, the gap 31, the core 32, and the coil 33), the distance between the magnetic-field generation device 30 and the disc plane, and the like.

According to the foregoing configuration, even though, due to relative movement between the magnetic-field generation device 30 and the disc, the ratio of the vertical magnetic field to the horizontal magnetic field sequentially changes, the accuracy of the magnetic transfer is hardly affected. As a result, it is less likely to occur that the C/N ratio of a reproduced signal from the slave disc 40 is deteriorated.

Being integrated in a magnetic recording device (a hard disc drive), the slave disc 40 can be appropriately utilized. As a hard disc drive utilized here, various types of known devices that have been sold by respective manufacturers may be utilized.

As described above, a magnetic-transfer method, a magnetic recording medium, and Embodiment 1 of a magnetic recording device, according to the present invention have been explained; however, the present invention is not limited to Embodiment 1 described above, but various aspects can be employed.

For example, in Embodiment 1 described above, by rotating the slave disc 40 (along with the master disc 46 contacted thereto), magnetic transfer is implemented onto the slave disc 40, through the magnetic-field generation device 30; however, a configuration can also be employed in which, after a magnetic field is applied to the slave disc 40 and the master disc 46, once or more times in the circumferential direction, the strength of the magnetic field is decreased down to a predetermined value, and then the rotation of the slave disc 40 and the master disc 46 is halted.

As discussed above, if, after the circumferential-direction transfer during one-turn of rotation, the strength of the magnetic filed is gradually decreased down to a predetermined value and then the rotation is halted, the transfer accuracy is much less affected, whereby the C/N ratio of a reproduced signal becomes good.

EXAMPLE 1

The slave disc 40 and the master disc 46 were created under conditions explained below, magnetic transfer was implemented by utilizing the magnetic-field generation device 30, the ratios of the strength Hdv of the vertical magnetic field to the strength Hdh of the horizontal magnetic field, as respective conditions under which transfer was implemented, were measured, and the C/N ratios of reproduced signals from the slave discs 40 onto which transfer had been implemented under the respective conditions were evaluated.

The master disc 46 was produced through the Ni-stamper method. In the first place, a Ni substrate was produced in which disc-shaped depressions, having a depth of 0.2 μm, were arranged, up to 20 mm to 40 mm from the center of a disc, in radial lines, having a width of 0.5 μm, that were spaced apart by 0.5 μm from each other, along the innermost circumference.

In this case, five types of Ni substrates were produced in each of which the ratio t/b of the thickness t of the magnetic layer 48 to be film-formed to the length b, along the track, of the protrusion was within the range from 0.3 to 5.0.

Through a vacuum film-formation apparatus, under the condition obtained by decreasing air pressure down to $1.33 \times 10^{-5}$ Pa ($10^{-7}$ Torr), at room temperature, and then by introducing argon gas to increase the air pressure up to 0.4 Pa ($3 \times 10^{-3}$ Torr), a FeCo film (soft-magnetic layer) having a thickness of 200 nm was formed on the Ni substrate and employed as the master disc 46. The coercivity Hc of the master disc 46 was 8 kA/m (1000 Oe), and the magnetic flux density Ms thereof was 28.9 T (23000 Gauss).

As the slave disc 40, a thin-film glass hard disc was utilized. Through a vacuum film-formation apparatus, under the condition obtained by decreasing air pressure down to $1.33 \times 10^{-5}$ Pa ($10^{-7}$ Torr), at room temperature, and then by introducing argon gas to increase the air pressure up to 0.4 Pa ($3 \times 10^{-3}$ Torr), a hard disc having a diameter of 95 nm (3.5-inch type) was produced, by heating a glass plate up to 200° C., that was formed of 60 nm thick CrTi and 25 nm thick CoCrPt, and had a magnetic flux density Ms of 5.7 T (4500 Gauss) and a coercivity Hc of 199 kA/m (2500 Oe).

The magnetic transfer was implemented through the configuration illustrated in FIG. 1. In the first place, by arranging the ring-type head electromagnet device 34 in such a way that the peak strength of the magnetic field at the top surface of the slave disc 40 was twice as large as the coercivity Hc of the slave disc 40, i.e., 398 kA/m (5000 Oe), the slave disc 40 was initially DC-magnetized.

Next, with the initially DC-magnetized slave disc 40 and the master disc 46 being contacted with each other, the electromagnet device 34 was arranged, after its current being adjusted in such a way that the peak strength of the magnetic field at the top surface of the slave disc 40 was 207 kA/m (2600 Oe).

In this situation, by moving the slave disc 40 and the master disc 46 that were contacted with each other, the clearance between the slave disc 40 and the master disc 46, and the electromagnet device 34 were changed in a number of steps so that the ratio of the strength Hdv of the vertical magnetic field to the strength Hdh of the horizontal magnetic field changed from 0.1 to 0.9. Then, by applying through the electromagnet device 34 transfer magnetic field in a direction reverse to that of the DC magnetization, the magnetic transfer was implemented. In addition, the adhesion of the slave disc 40 to the master disc 46 was implemented, by applying pressure to an aluminum plate flanked with rubber plate.

The signal transferred to the slave disc 40 was evaluated through an electromagnetic conversion characteristic measurement apparatus (model LS-90 from Kyodo Electronics inc.). As a head, an MR head was utilized that had a reproduction-head gap of 0.06 μm, a reproduction-track width of 0.14 μm, a recording-head gap of 0.4 μm, and a recording-track width 2.4 μm. By implementing through a spectral analyzer frequency separation of a read-out signal, the difference (C/N) between the peak strength C of the primary signal and extrapolated medium noise N was measured.

In addition, by separating the slave disc 40 from the master disc 46 and inserting a magnetic-field measurement terminal between them, and by changing in a number of steps the clearance between the terminal and the electromagnet device 34, the strength Hdv of the vertical magnetic field and the strength Hdh of the horizontal magnetic field were each measured under respective conditions.

A table in FIG. 9 represents the results of Example 1. The C/N ratios (in units of dB) in the table are each represented based on the C/N ratio, as a reference value of 0 dB, in the case of where the ratio t/b and the ratio Hdv/Hdh are 0.5.

Figure 10:
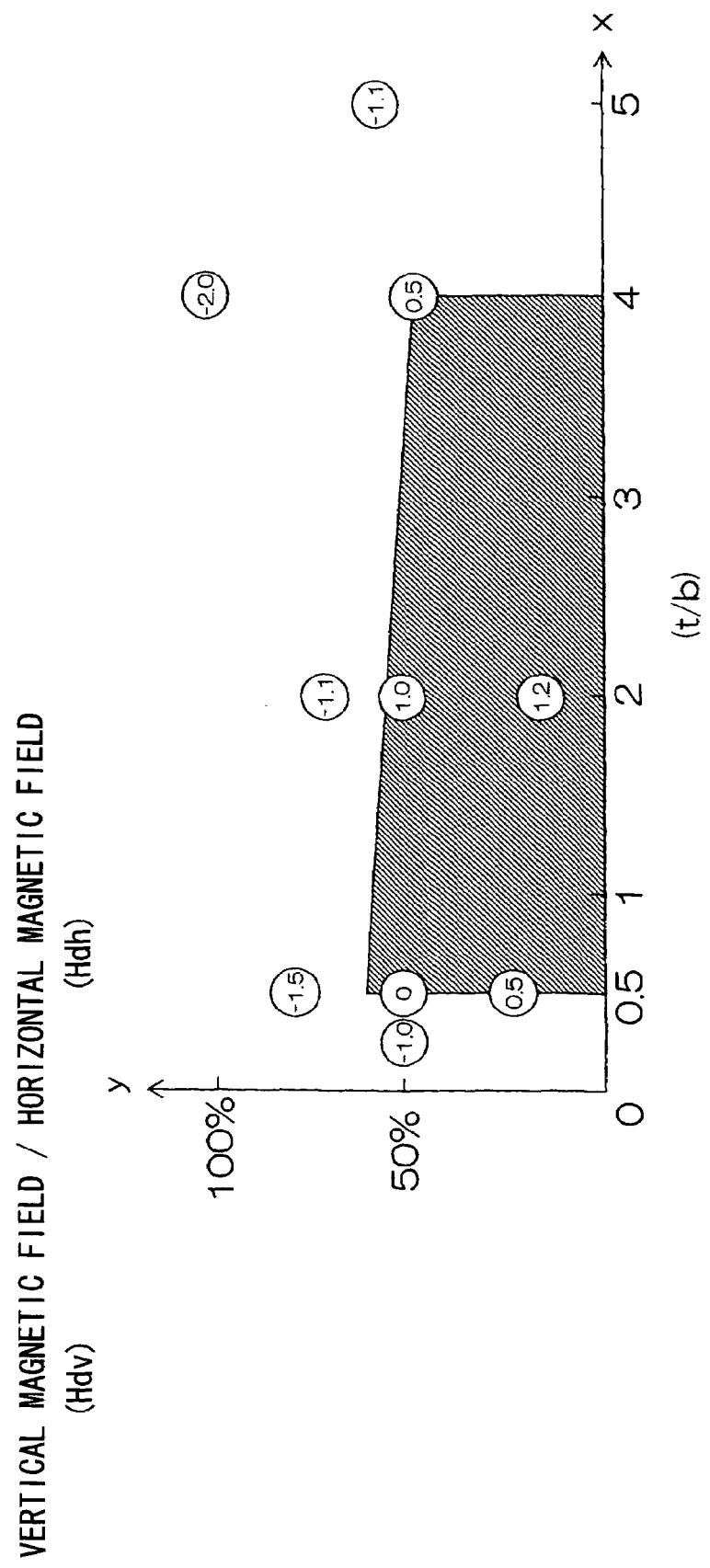
FIG. 10 is a graph representing results of Example 1.

Moreover, FIG. 10 is a graph obtained by plotting data (the results of Example 1) in the table in FIG. 9 into the foregoing graph, in FIG. 8, for explaining the optimal area for the ratio Hdv/Hdh and the ratio t/b. In the graph in FIG. 10, numeral values inside circles designate the C/N ratios.

As represented in FIG. 10, it can be seen that the C/N ratios within the optimal area (the hatched area) specified in accordance with the present invention all indicate good values, and the other C/N ratios outside the optimal area are all inferior; therefore, an effect of the present invention was demonstrated.

In addition, when the slave disc 40 whose C/N ratio was within the area specified in accordance with the present invention was integrated (replacing an existing hard disc) in a magnetic recording device (hard disc drive) supplied by a drive manufacturer, and then the properties were evaluated, good tracking properties were obtained.

Next, as Embodiment 2, a method of magnetic transfer through the magnetic-transfer device 10 configured as described above will be described. The same materials as those in Embodiment 1 are indicated by the same reference numerals, and explanations for them will be omitted.

In the first place, as illustrated in FIG. 6A, described above, that represents a basic aspect of magnetic transfer, by applying in one direction along the track (in the circumferential direction) an initial magnetic field Hi to the slave disc 40, initial magnetization (DC degaussing) is preliminarily implemented. In the initial magnetization, a magnetic field is utilized that has at at least one position along the track a portion where the magnetic-field strength is the same or larger than the coercivity Hc of the slave disc 40, or preferably, a magnetic field is utilized that has distribution of magnetic-field strength in which a portion where the magnetic-field strength is the same or larger than the coercivity Hc of the slave disc 40 is included only in one direction along the track, and the magnetic-field strength in the reverse direction is less then the coercivity Hc of the slave disc 40 in either direction along the track. With the magnetic filed being generated at a certain part along the track, by rotating the slave disc 40, or by revolving the magnetic field along the track, the entire tracks are initially magnetized (DC-degaussed).

Next, as illustrated in FIG. 6B, with the slave side (magnetic recording layer) of the slave disc 40 and the information-carrying side, of the master disc 46, configured of the magnetic layer 48 coated on protrusions and depressions in the magnetic layer 47, being contacted with each other, by applying, along the track of the slave disc 40 and in the direction reverse to the direction of the initial magnetic field Hi, the transfer magnetic field Hd to the slave disc 40 and the master disc 46, the magnetic transfer is implemented.

As a result, as illustrated in FIG. 6C, onto the slave side (track) of the slave disc 40, a magnetization pattern is transferred and recorded that is in accordance with the pattern configured of contacted protrusions and depressions in the magnetic layer 48, i.e., the information-carrying side of the master disc 46.

In addition, even when the depressions and protrusions on the substrate 47 of the master disc 46 is a negative pattern opposite to the positive pattern illustrated in FIGS. 6A to 6C, by making the directions of the initial magnetic field Hi and the transfer magnetic field Hd reversed to those of the directions of the initial magnetic field Hi and the transfer magnetic field Hd in the case of the positive pattern, a similar magnetization pattern can be transferred and recorded.

In that case, with regard to the circumferential-direction transfer magnetic field Hd, it is important to carry out the magnetic transfer in such a way that the strength Hdv of a magnetic field whose direction is vertical to the disc plane is the same or smaller than 40% of the strength Hdh of a magnetic field whose direction is in parallel with the disc plane.

Figure 11:
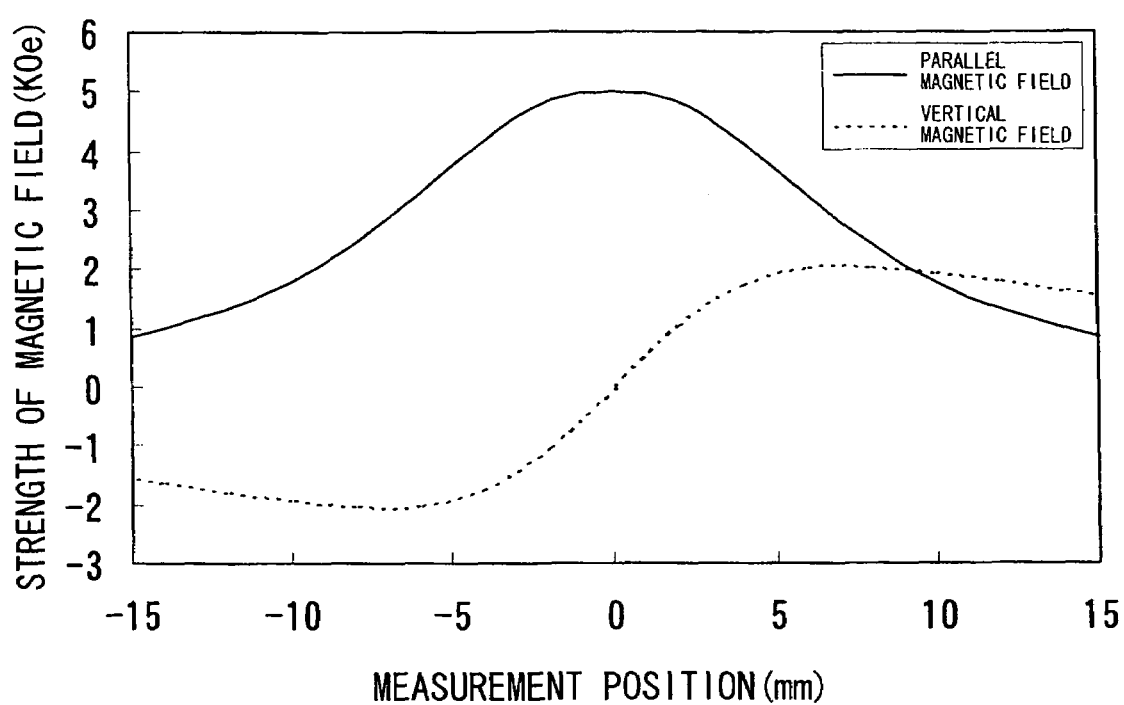
FIG. 11 is a graph representing distribution of the strength of the parallel magnetic field and the strength of the vertical magnetic field at each of positions, in FIG. 4, arranged in parallel with a slave disc.

FIG. 11 is a graph representing distribution of the strength Hdh of the parallel magnetic field and the strength Hdv of the vertical magnetic field at each of parallel positions, in FIG. 4, arranged in parallel with the slave disc. As can be seen from FIG. 11, at the middle position between the N pole and the S pole, of the magnet, the strength Hdh of the horizontal magnetic field is maximal, and the strength Hdv of the vertical magnetic field is zero. In contrast, the farther the position is away from the middle position between the N pole and the S pole, of the magnet, the smaller the strength Hdh of the parallel magnetic field is, and the larger the strength Hdv of the vertical magnetic field is.

With the transfer magnetic field Hd as described above, at a parallel position C (within a circle located in the center) in FIG. 4, Hdv/Hdh is zero, and at parallel positions R (within a circle located right-hand) and L (within a circle located left-hand), in FIG. 4, Hdv/Hdh is not zero.

Accordingly, with regard to the circumferential-direction magnetic field Hd, it is required to optimally set up each of constituent elements (the electromagnet device 34, the gap 31, the core 32, and the coil 33), the distance between the magnetic-field generation device 30 and the disc plane, and the like, in such a way that the strength Hdv of a magnetic field whose direction is vertical to the disc plane is the same or smaller than 40% of the strength Hdh of a magnetic field whose direction is in parallel with the disc plane.

According to the foregoing configuration, the strength Hdv of a magnetic field, of the circumferential magnetic field, whose direction is vertical to the disc plane is made the same or smaller than 40% of the strength Hdh of a magnetic field whose direction is in parallel with the disc plane; therefore, even though, due to relative movement between the magnetic-field generation device 30 and the disc, the ratio of the vertical magnetic field to the horizontal magnetic field sequentially changes, the accuracy of the magnetic transfer is hardly affected. As a result, it does not occur that the C/N ratio of a reproduced signal from the slave disc 40 is deteriorated.

Being integrated in a magnetic recording device (a hard disc drive), the slave disc 40 can be appropriately utilized. As a hard disc drive utilized here, various types of known devices that have been sold by respective manufacturers may be utilized.

As described above, a magnetic-transfer method, a magnetic recording medium, and Embodiment 2 of a magnetic recording device, according to the present invention have been explained; however, the present invention is not limited to Embodiment 2 described above, but various aspects can be employed.

For example, in Embodiment 2 described above, by rotating the slave disc 40 (along with the master disc 46 contacted thereto), magnetic transfer is implemented onto the slave disc 40, through the magnetic-field generation device 30; however, a configuration can also be employed in which, after a magnetic field is applied to the slave disc 40 and the master disc 46, once or more times in the circumferential direction, the strength of the magnetic field is decreased down to a predetermined value, and then the rotation of the slave disc 40 and the master disc 46 is halted.

As discussed above, if, after the circumferential-direction transfer during one-turn of rotation, the strength of the magnetic filed is gradually decreased down to a predetermined value and then the rotation is halted, the transfer accuracy is much less affected, whereby the C/N ratio of a reproduced signal becomes good.

EXAMPLE 2

The slave disc 40 and the master disc 46 were created under conditions explained below, magnetic transfer was implemented by utilizing the magnetic-field generation device 30, the ratios of the strength Hdv of the vertical magnetic field to the strength Hdh of the horizontal magnetic field, as respective conditions under which transfer was implemented, were measured, and the C/N ratios of reproduced signals from the slave discs 40 onto which transfer had been implemented under the respective conditions were evaluated.

The master disc 46 was produced through the Ni-stamper method. In the first place, a Ni substrate was produced in which disc-shaped depressions, having a depth of 0.2 μm, were arranged, up to 20 mm to 40 mm from the center of a disc, in radial lines, having a width of 0.5 μm, that were spaced apart by 0.5 μm from each other, along the innermost circumference.

Under the condition obtained by decreasing air pressure down to $1.33 \times 10^{-5}$ Pa ($10^{-7}$ Torr), at room temperature, and then by introducing argon gas to increase the air pressure up to 0.4 Pa ($3 \times 10^{-3}$ Torr), as the master disc 46, a FeCo film (soft-magnetic layer) having a thickness of 200 nm was formed on the Ni substrate, by means of a vacuum film-formation apparatus. The coercivity Hc of the master disc 46 was 8 kA/m (100 Oe), and the magnetic flux density Ms thereof was 28.9 T (23000 Gauss).

As the slave disc 40, a thin-film glass hard disc was utilized. Through a vacuum film-formation apparatus, under the condition obtained by decreasing air pressure down to $1.33 \times 10^{-5}$ Pa ($10^{-7}$ Torr), at room temperature, and then by introducing argon gas to increase the air pressure up to 0.4 Pa ($3 \times 10^{-3}$ Torr), a hard disc having a diameter of 95 nm (3.5-inch type) was produced, by heating a glass plate up to 200° C., that was formed of 60 nm thick CrTi and 25 nm thick CoCrPt, and had a magnetic flux density Ms of 5.7 T (4500 Gauss) and a coercivity Hc of 199 kA/m (2500 Oe).

Figure 12:
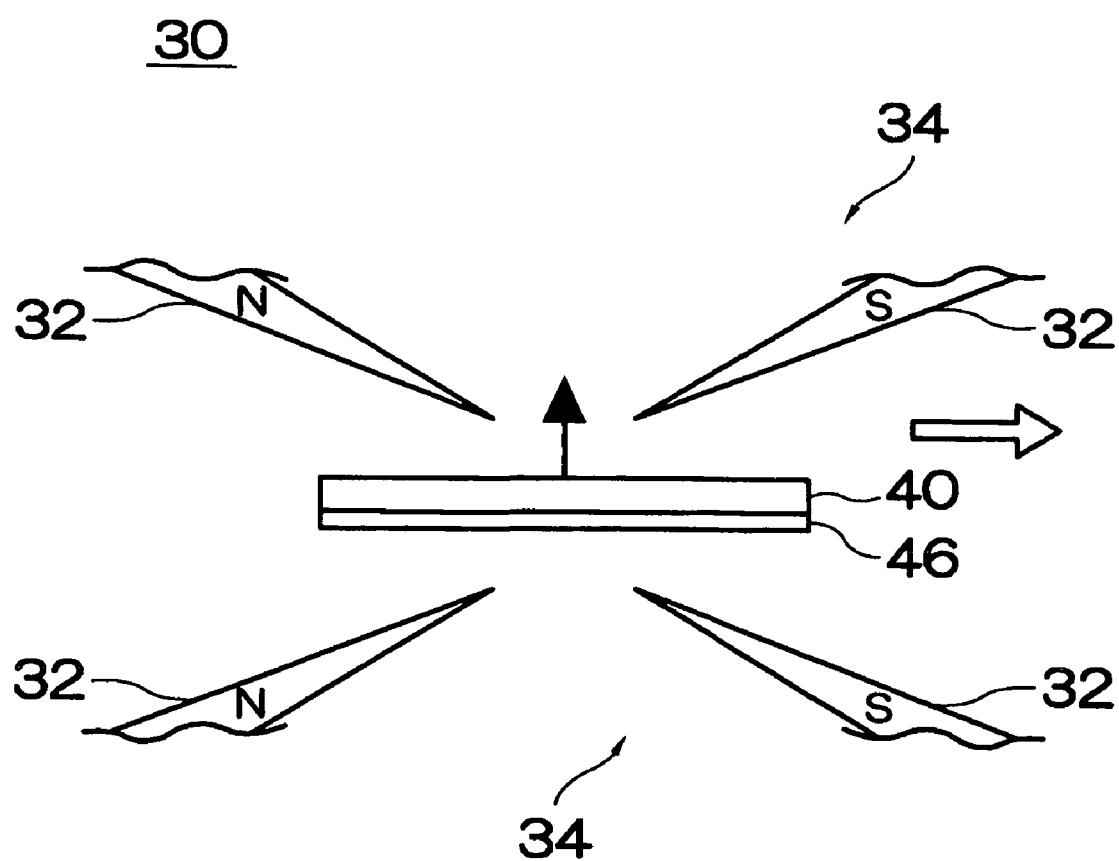
FIG. 12 is a view illustrating a configuration of magnetic transfer according to Example 2.

The magnetic transfer was implemented through the configuration illustrated in FIG. 12. In the first place, by arranging the ring-type head electromagnet device 34 illustrated in FIG. 1 in such a way that the peak strength of the magnetic field at the top surface of the slave disc 40 was twice as large as the coercivity Hc of the slave disc 40, i.e., 398 kA/m (5000 Oe), the slave disc 40 was initially DC-magnetized.

Next, with the initially DC-magnetized slave disc 40 and the master disc 46 being contacted with each other, the electromagnet device 34 was arranged, after its current being adjusted in such a way that the peak strength of the magnetic field at the top surface of the slave disc 40 was 207 kA/m (2600 Oe).

In this situation, by moving in a direction indicated by an arrow in FIG. 12 the slave disc 40 and the master disc 46 that were contacted with each other, the clearance between the slave disc 40 and the master disc 46, and the electromagnet device 34 were changed in a number of steps so that the ratio of the strength Hdv of the vertical magnetic field to the strength Hdh of the parallel magnetic field changed. Then, by applying through the electromagnet device 34 transfer magnetic field in a direction reverse to that of the DC magnetization, the magnetic transfer was implemented. In addition, the adhesion of the slave disc 40 to the master disc 46 was implemented, by applying pressure to an aluminum plate flanked with rubber plate.

The signal transferred to the slave disc 40 was evaluated through an electromagnetic conversion characteristic measurement apparatus (model LS-90 from Kyodo Electronics inc.). As a head, an MR head was utilized that had a reproduction-head gap of 0.06 μm and a reproduction-track width of 0.14 μm. By implementing through a spectral analyzer frequency separation of a read-out signal, the difference (C/N) between the peak strength C of the primary signal and extrapolated medium noise N was measured.

In addition, by separating the slave disc 40 from the master disc 46, and by changing in a number of steps the clearance between a magnetism measurement terminal and the electromagnet device 34, the strength Hdv of the vertical magnetic field and the strength Hdh of the horizontal magnetic field were each measured under respective conditions.

Figure 13:
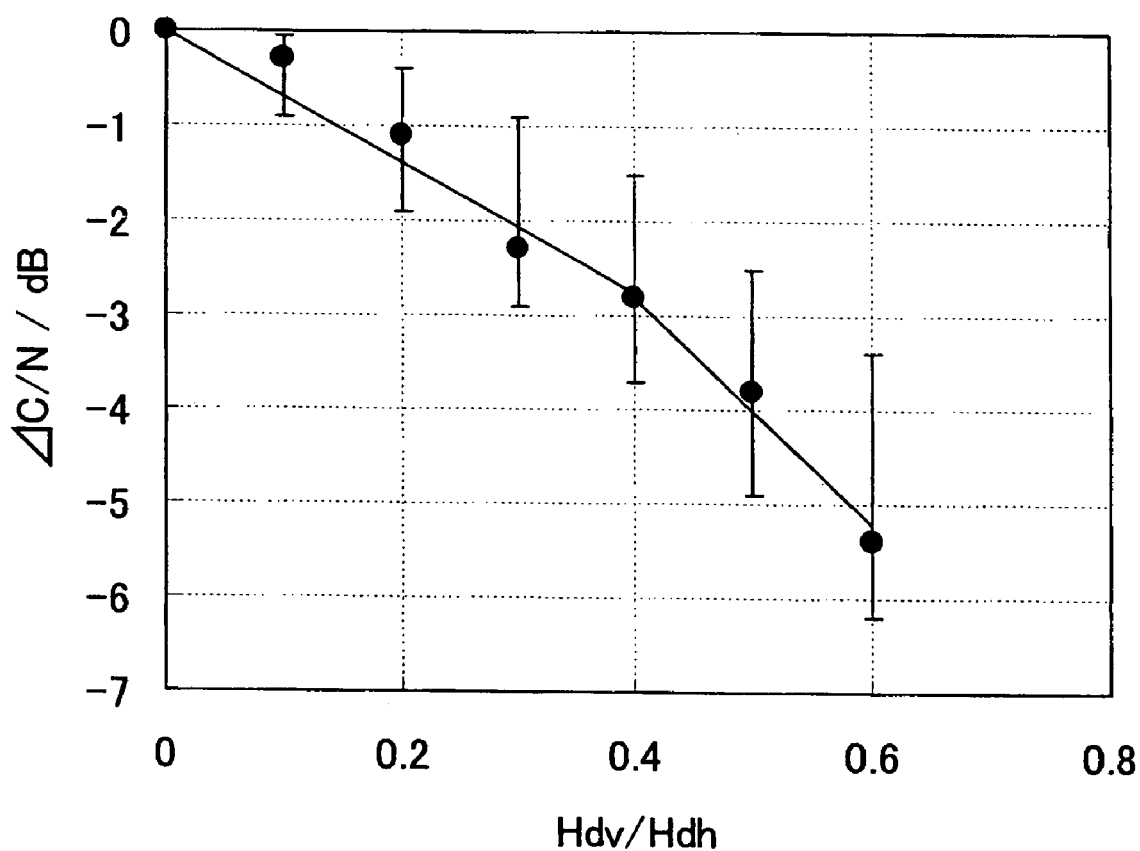
FIG. 13 is a graph representing results of Example 2.

A graph in FIG. 13 represents the results of Example 2. The ratio of the strength Hdv of the vertical magnetic field to the strength Hdh of the horizontal magnetic field is along the abscissa in FIG. 13, and the C/N ratio (in units of dB) is along the ordinate. As can be seen from FIG. 13, when the strength ratio is 0%, the C/N ratio is best, and the larger the strength ratio is, the more the C/N ratio is deteriorated. However, the curve increases its gradient at the point where the strength ratio is 40%. In addition, it can be seen that as far as the strength ratio is the same or smaller than 40%, the C/N ratio is larger than –3 dB, and the accuracy of the magnetic transfer is hardly affected.

When the slave disc 40 whose C/N ratio was within the area was integrated (replacing an existing hard disc) in a magnetic recording device (hard disc drive) supplied by a drive manufacturer, and then the properties were evaluated, good tracking properties were obtained.

What is claimed is:

1. A magnetic-transfer method comprising the steps of:
    initially DC-magnetizing a transfer-recipient disc in a circumferential direction, by applying a magnetic field to the transfer-recipient disc in the circumferential direction thereof;
    bringing initially DC-magnetized transfer-recipient disc and a master disc into close contact with each other, on the top side of the master disc a magnetic layer including a great number of protrusions that configure a magnetic pattern being formed, ratio t/b of thickness t of the magnetic layer to circumferential length b of the protrusion being from 0.5 to 4.0; and
    executing magnetic transfer in such a way that a magnetic-field generation device is provided, and that, when a magnetic field is applied in a circumferential direction to the transfer-recipient disc and the master disc so as to transfer the magnetic pattern of the master disc onto the transfer-recipient disc, ratio Hv/Hh of the strength Hv of a magnetic field, of the circumferential magnetic field, that is vertical to the top side of the transfer-recipient disc, to the strength Hh of a magnetic field, of the circumferential magnetic field, that is in parallel with the top side of the transfer-recipient disc, is made equal to or smaller than 0.629-0.0571×t/b.

2. The magnetic-transfer method according to claim 1, wherein magnetic transfer is executed while moving the transfer-recipient disc and the master disc that are closely contacted to each other, relatively to the magnetic-field generation device.

3. The magnetic-transfer method according to claim 2, wherein, after the circumferential magnetic field is applied, once or more times in the circumferential direction, to the transfer-recipient disc and the master disc that are closely contacted to each other, the strength of circumferential magnetic field is decreased down to a predetermined value, and then relative movement, to the magnetic-field generation device, of the transfer-recipient disc and the master disc that are closely contacted to each other is halted.

* * * * *